(12) United States Patent
Völkel

(10) Patent No.: US 11,385,326 B2
(45) Date of Patent: Jul. 12, 2022

(54) HYBRID ANALOG AND DIGITAL BEAMFORMING

(71) Applicant: Metawave Corporation, Palo Alto, CA (US)

(72) Inventor: Armin Rainer Völkel, Mountain View, CA (US)

( * ) Notice: Subject to any disclaimer, the term of this patent is extended or adjusted under 35 U.S.C. 154(b) by 334 days.

(21) Appl. No.: 16/440,976

(22) Filed: Jun. 13, 2019

(65) Prior Publication Data

US 2020/0333431 A1    Oct. 22, 2020

Related U.S. Application Data

(60) Provisional application No. 62/684,679, filed on Jun. 13, 2018.

(51) Int. Cl.
*G01S 7/03* (2006.01)
*H01Q 3/34* (2006.01)

(52) U.S. Cl.
CPC ............ *G01S 7/03* (2013.01); *H01Q 3/34* (2013.01)

(58) Field of Classification Search
None
See application file for complete search history.

(56) References Cited

U.S. PATENT DOCUMENTS

| | | | |
|---|---|---|---|
| 6,043,790 A | 3/2000 | Derneryd et al. | |
| 6,492,949 B1 | 12/2002 | Breglia et al. | |
| 6,768,453 B2 | 7/2004 | Solbach | |
| 7,250,908 B2 | 7/2007 | Lee | |
| 7,928,900 B2 | 4/2011 | Fuller et al. | |
| 2008/0258993 A1* | 10/2008 | Gummalla | H01Q 1/243 343/876 |
| 2011/0175789 A1 | 7/2011 | Lee et al. | |
| 2015/0022421 A1 | 1/2015 | Vigano et al. | |
| 2015/0229028 A1 | 8/2015 | Bily et al. | |
| 2016/0087349 A1 | 3/2016 | Lee et al. | |
| 2016/0233588 A1 | 8/2016 | Bily et al. | |
| 2018/0351250 A1* | 12/2018 | Achour | G01S 7/03 |

(Continued)

OTHER PUBLICATIONS

D. Patron, "Compact Reconfigurable Antennas for Wireless Systems and Wearable Applications," Ph.D. dissertation, Dept. of Electrical and Computer Eng., Drexel University, Philadelphia, PA, May 2015.

(Continued)

*Primary Examiner* — Whitney Moore
(74) *Attorney, Agent, or Firm* — Sandra Lynn Godsey

(57) ABSTRACT

A radar system having an array of radiating elements configured for both analog beamforming and digital beamforming as analog parameters of the individual radiating elements are controlled, while digital control expands the field of view of the system. The radar system can include an array of radiating elements and a reactance control module coupled to the array of radiating elements and configured to adjust a reactance in one or more radiating elements of the array of radiating elements. The radar system also includes a digital control mechanism coupled to the array of radiating elements and configured to adjust a field of view of the array of radiating elements. A hybrid beamforming system and a method for a beamforming antenna are also provided herein.

20 Claims, 14 Drawing Sheets

(56) References Cited

U.S. PATENT DOCUMENTS

2019/0074588 A1 3/2019 Scarborough et al.
2019/0379446 A1* 12/2019 Rothaar ............. H04B 7/18541

OTHER PUBLICATIONS

M. Reil et al., "Millimeter-Wave Beamforming Antenna Array Design Choices and Characterization," White Paper, Rohde & Schwarz GmbH & Co KGpp. 1-28, Oct. 2016.

M. Moeini-Fard, et al., "Transmit Array Antenna Using Nonuniform Dielectric Layer," Advances in Wireless Communications and Networks, vol. 3, No. 3, pp. 23-28, Jun. 2017.

C. Plapous et al., "Reactance domain MUSIC algorithm for electronically steerable parasitic array radiator," in IEEE Transactions on Antennas and Propagation, vol. 52, No. 12, pp. 3257-3264, Dec. 2004.

J. Ala-Laurinaho, et al., "2-D Beam-Steerable Integrated Lens Antenna System for 5G E-Band Access and Backhaul," in IEEE Transactions on Microwave Theory and Techniques, vol. 64, No. 7, pp. 2244-2255, Jul. 2016.

X. Gu et al., "A multilayer organic package with 64 dual-polarized antennas for 28GHz 5G communication," 2017 IEEE MTT-S International Microwave Symposium (IMS), Honolulu, HI, pp. 1899-1901, Jun. 2017.

A. Babakhani et al.,"Transmitter Architectures Based on Near-Field Direct Antenna Modulation," in IEEE Journal of Solid-State Circuits, vol. 43, No. 12, pp. 2674-2692, Dec. 2008.

H. Schippers et al., "Broadband Conformal Phased Array with Optical Beam Forming for Airborne Satellite Communication," IEEE Aerospace Conference, Mar. 2008.

J. Reis, et al., "Two-Dimensional Antenna Beamsteering Using Metamaterial Transmitarray," 2015 9th European Conference on Antennas and Propagation (EuCAP), Lisbon, Portugal, Apr. 2015.

H. Zhou et al., "Evolution of Satellite Communication Antennas on Mobile Ground Terminals," International Journal of Antennas and Propagation, vol. 2015, Article ID 436250, Jul. 2015.

Y. J. Guo et al., "Low-cost beamforming employing reconfigurable antennas," 2014 International Workshop on Antenna Technology: Small Antennas, Novel EM Structures and Materials, and Applications (iWAT), Sydney, Australia, pp. 155-158, Mar. 2014.

L.-Y.Ji et al., "Pattern reconfigurable Fabry-Perot cavity antenna," 2015 International Symposium on Antennas and Propagation (ISAP), Hobart, TAS, pp. 1-3, Nov. 2015.

R. Z. Syeda, "Design and performance analysis of switched beam series-fed patch antenna array for 60GHz WPAN Applications," Master Thesis, Department of Signal Theory and Communications, Polytechnic University of Catalunya, pp. 1-76, 2014.

M.C. Johnson, "Self-Optimizing Metamaterial Antennas," Ph.D. dissertation, Dept. of Applied Mathematics, Univ. of Washington, Seattle, WA, 2014.

J.-Y. Park et al., "A 60 GHz integrated antenna array for high-speed digital beamforming applications," IEEE MTT-S International Microwave Symposium Digest, 2003, Philadelphia, PA, USA, vol. 3, pp. 1677-1680, Jun. 2003.

J. Schoebel et al., "Planar Antenna Technology for mm-Wave Automotive Radar, Sensing, and Communications," i Radar Technology, Guy Kouemou (Ed.), ISBN: 978-953-307-029-2, InTech, ch. 15, pp. 297-318, Jan. 2010.

S. Bildik et al., "Reconfigurable Folded Reflectarray Antenna Based Upon Liquid Crystal Technology," in IEEE Transactions on Antennas and Propagation, vol. 63, No. 1, pp. 122-132, Jan. 2015.

* cited by examiner

HYBRID ANALOG AND DIGITAL BEAMFORMING

CROSS-REFERENCE TO RELATED APPLICATIONS

This application claims priority from U.S. Provisional Application No. 62/684,679, filed on Jun. 13, 2018, and incorporated by reference in its entirety.

BACKGROUND

Wireless systems have both transmission and reception modules, such as to detect a target with a radar system and to send and receive communications with a cellular system. Beamforming is used to change the transmit and receive radiation signals. These systems have multiple antenna elements spaced according to wavelength of the processed signals, in which the antenna elements are controlled so that signals received at each antenna element has a phase relationship to other elements. This phase relationship may indicate a phase difference that controls the direction of the radiated beam. In many wireless communication systems, there is a uniform phase difference that increases from one antenna element to another. The resultant radiation pattern acts as a plane wave in the far field that is directed as a function of the phase combinations. There is a boresight direction that is approximately perpendicular to a plane of the antenna elements, such as the surface. The direction of a beam is measured with respect to the boresight direction, as it forms a directional angle, $\theta$. An antenna system can scan an area, or Field of View (FOV), over a range of directional angles, such as from ±90° measured with respect to the boresight.

There are a variety of antenna systems incorporating the phase shifting method of signal generation. For example, current systems incorporate Analog Beamforming (ABF) or Digital Beamforming (DBF), each of which changes phase of an antenna element at the antenna element, referred to as ABF, or as part of baseband processing, referred to as DBF. A radar system uses one of these techniques to generate radiation beams to identify a location of an object, referred to as a target, by reflections or echoes from a transmitted signal. There are advantages and disadvantages to both techniques as DBF provides flexibility but at the cost of high power consumption and ABF offers less flexibility but at reduced power requirements.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1:
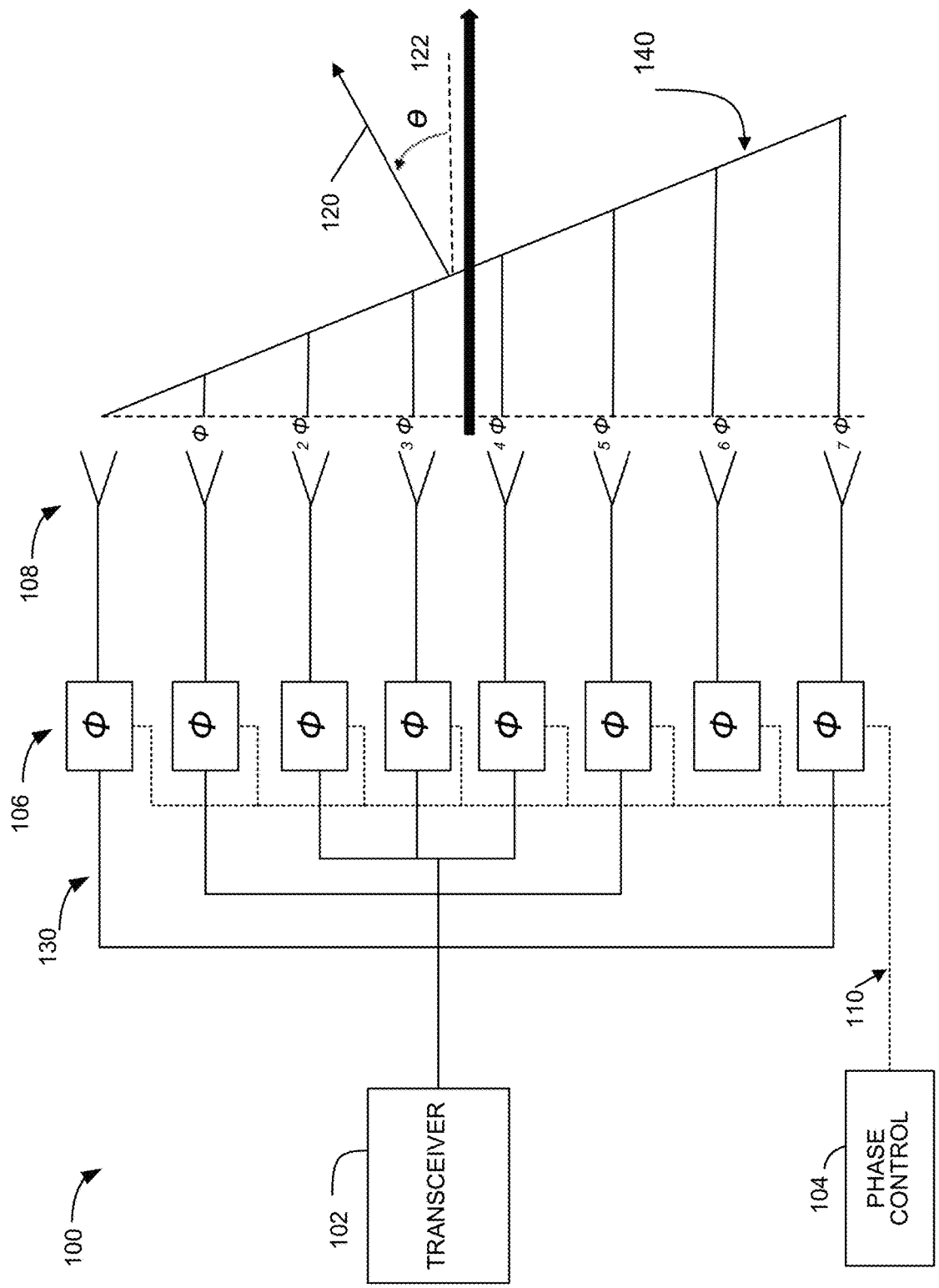
FIG. 1 illustrates an example of an antenna system having analog beamforming capability.

The present disclosure relates to wireless communications and antenna structures for transmitting and receiving signals. In particular, the present disclosure relates to radar systems and advanced communications systems.

Antenna performance in resolution, range and field of view is becoming a critical focus of design and implementation of antenna technologies. This is due in large part to the ubiquity of wireless communications, the specifications of new wireless communication standards and technologies, such as 5G cellular, and to advances in automation for automotive technologies, in particular, autonomous vehicles and driver-assist technology.

Wireless systems generally include multiple antennas, where each individual antenna has a specific radiation pattern defined by the gain of that antenna. Beamforming and beam steering are utilized to direct signals from individual antennas over a desired FOV. For radar, this means the area within which the radar can detect objects, or targets. In wireless communications, this means the area within which a user (referred to as having User Equipment (UE)) is detected and a communication is maintained, such as to track a UE. As automation at driving speeds and movement of UEs becomes more prevalent in cities, around buildings and so forth, such technology may require that the antenna system can steer the beam and adjust (or modify) the beamform rapidly. In many applications, these changes are done in microseconds, such as when a car is driving at 80 miles per hour, or 50 km per hour. Additionally, these antennas are to perform well in a variety of environments, including weather conditions and infrastructures.

As used herein, the term "field of view" or FOV, refers to the radiation pattern of the antenna, which may be defined by the area that is within a gain range of the antenna. This radiation pattern defines an area for sending and/or receiving electromagnetic signals (e.g., FOV), and is effectively "hard-coded" by the antenna design. In many wireless systems, this hard-coded radiation pattern may not be changed after fabrication of the antenna.

An antenna with a good angular resolution needs a wide aperture to make the beam narrow, and many individual elements to allow for large steering angles. If there is more information available about what the receiver sees, additional signal processing options are available to refine the angular resolution beyond the beam width of the antenna array. As an example, if only "well-separated" targets are expected, DBF can sweep the receive beam over the accessible angular region and fit the maxima in intensity to the expected response from an individual target in the vicinity of the maximum. In other words, the intensity of the total response signal that is generated can be detected when combining the received signals of the individual antennas corresponding to different beam directions. When the antenna is "pointing" in the direction of the target, the response signal strength should be around a maximum value, while the intensity becomes weaker when the beam is not aligned with the target.

In ABF, the antenna elements, or radiating elements, are each coupled to a phase control element, such as a phase shifter. Control of the phase shifters steers the beam to scan a field of view. The combination of the radiation beams from the antenna elements forms a resultant main beamform having directivity as a function of the various phase shifts of individual antenna elements. The system is then able to steer the main beam and scan a field of view. In some aspects, antenna systems include phase shifters to modify the radiation pattern produced by the antennas. However, the phase shifters have inherent variations in its operation due to temperature, time, mechanical vibrations, and calibration process.

In the subject technology, an antenna array allows active control of the phase of transmitted and received signals at each individual antenna, which dynamically controls the radiation pattern of the array. This dynamic control enables beam steering. The subject technology includes two processes for active phase control. The first process involves controlling the phase in the Radio Frequency (RF) Front-End (FE) of the transceiver, which is referred to as ABF. The second process involves controlling the phase in the digital input/output streams, which is referred to as DBF. In some aspects, DBF may be considered a spatial filtering of a signal that digitally controls phase shifting, amplitude tapering and/or beam formation. The subject technology also includes Analog-to-Digital Converters (ADCs) and Digital-to-Analog Converters (DACs) for transformations of a signal between an Intermediate Frequency (IF) in the digital domain and a Radio Frequency (RF) in the analog domain. In addition, DBF processing includes complex calculations to achieve the phase control in the digital domain, which incurs processing capabilities and introduces latency into beamforming. Although each approach may have its advantages/disadvantages, the subject technology optimizes the advantages while mitigating the disadvantages.

The subject technology improves the accuracy of a DBF system and reduces the power consumption of the overall antenna system. The subject technology provides for a combination of ABF and DBF by using an array of antennas having designated subarrays of antennas, where each subarray antenna includes an ABF antenna, while a super array is operated as a DBF antenna. This combination of ABF and DFB offers several advantages over prior approaches in beamforming and beam steering. For example, using steerable antennas as the building blocks of the super array enables high resolution in any angle available within a steering region of the ABF antennas. In contrast, existing DBF antennas may only have one static field of view. Having the DBF antenna operate as a super array provides higher resolution compared to an individual ABF subarray. This allows the design and fabrication of ABF antennas with less stringent design rules than needed for a single ABF antenna with the same angular resolution, thus enabling a cost savings. By using DBF for the super array, signal processing algorithms can be utilized for higher resolution approaches that may need at least two different antennas receiving return signals from a same scene.

FIG. 1 illustrates an example of an antenna system 100 having analog beamforming capability. The antenna system 100 includes a transceiver 102, a phase control module 104, phase shifters 106 and a power divider circuit 130. The phase shifters 106 are respectively coupled to the antenna elements 108 through the power divider circuit 130. Each of the phase shifters 106 is coupled to a transmission path of the power divider 130 and to a respective antenna element 108. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The phase shifters 106 are individually controlled by a separate control signal from the phase control module 104 via connections 110, which causes the antenna elements 108 to produce a radiation wave front 140. As illustrated in FIG. 1, each of the antenna elements 108 has a phase shift that contributes to the radiation wave front 140 having directivity 120 at an angle 122 (depicted as "θ"). The amount of phase shift applied to each of the antenna elements 108 may be the same in some implementations, or the amount of phase shift applied to each of the antenna elements may be different in other implementations.

Figure 2:
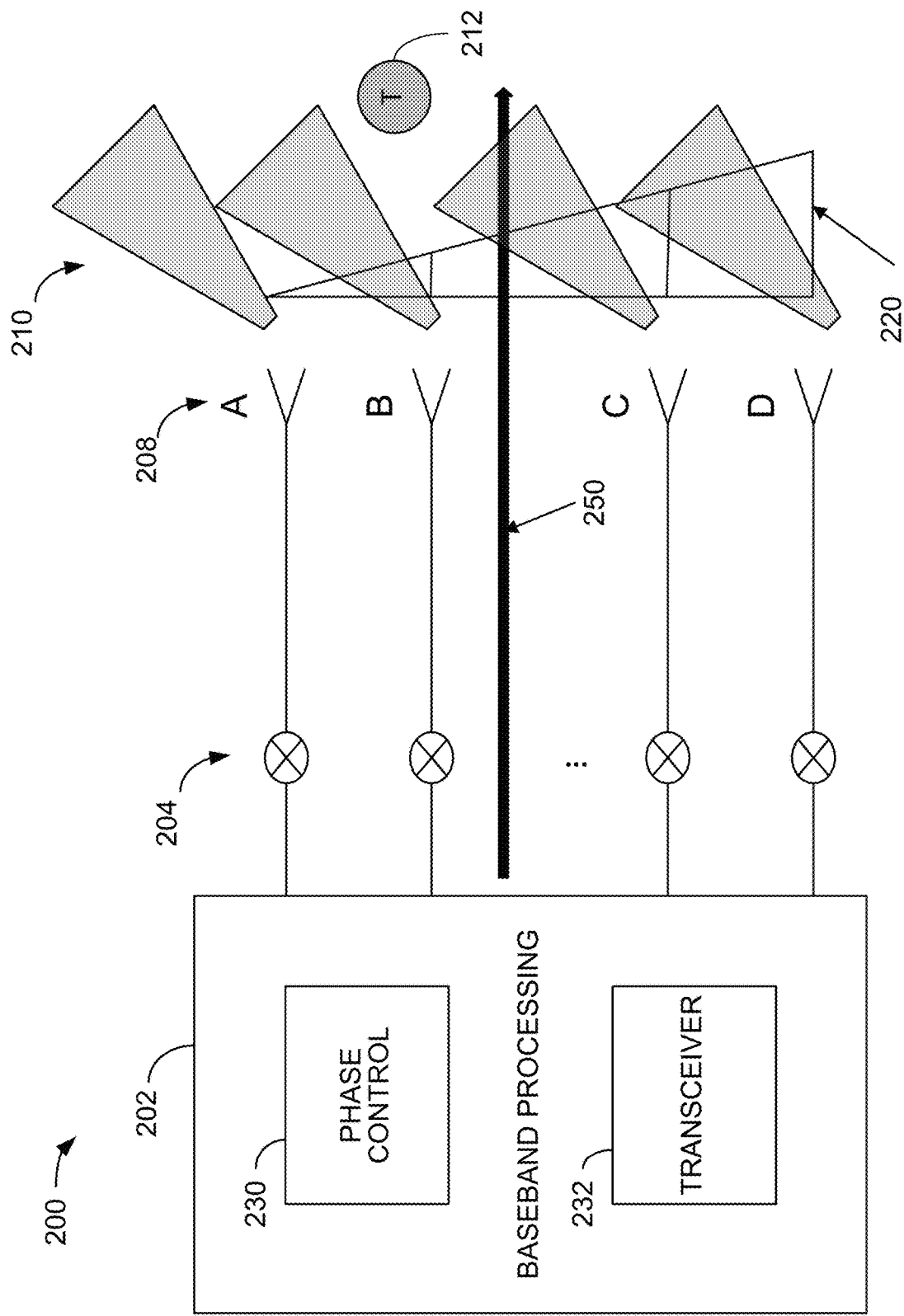
FIG. 2 illustrates an example of an antenna system having digital beamforming capability.

FIG. 2 illustrates an example of an antenna system 200 having digital beamforming capability. The antenna system 200 includes a baseband processing unit 202, frequency conversion modules 204, and radiating elements 208. The baseband processing unit 202 includes a phase control module 230 and a transceiver 232. The baseband processing unit 202 is coupled to the frequency conversion modules 204 and to the radiating elements 208 through a plurality of transmission paths. Not all of the depicted components may be used, however, and one or more implementations may include additional components not shown in the figure. Variations in the arrangement and type of the components may be made without departing from the scope of the claims set forth herein. Additional components, different components, or fewer components may be provided.

In operation, the transceiver 232 generates a transmission signal 250 for transmission, and the antenna elements 208 radiate the transmission signal 250 to a target 212 within a surrounding environment. In some aspects, the transmission signal 250 may include a Frequency Modulated Continuous Wave (FMCW) signal. The processing of each transmission path is performed by the baseband processing unit 202. For example, the transceiver 232 receives the return signals for further processing.

The radiating elements 208 (depicted as "A", "B", "C", "D") have fields of view 210, within which the radiating element 208 receives comprehensible signals. As used herein, the term "comprehensible signals" refers to signals having a sufficient amount of signal strength power to be identified as reflections or echoes based at least on the transmission signal 250. As depicted in FIG. 2, the antenna system 200 detects a target 212 (depicted as "T") by determining which of the radiating elements 208 is closest to the target based on the intensity of received signals. When the baseband processing unit 202, for example, identifies which of the radiating elements 208 has the highest received signal intensity, $I_{max}$, the location of the target 212 is determined to be within the FOV 210 of that radiating element 208.

In DBF, the transceiver 232 is coupled to multiple radiating elements, such as the radiating elements 208, in which the phase shifting can performed by the phase control module 230. In one or more implementations, the phase shifting is performed by the transceiver 232 (or in tandem with the phase control module 230). In some implementations, each of the frequency conversion modules 204 includes a phase shifting module for adjusting a phase shift of the input signal. In this respect, the phase control module 230 generates and sends digital control signals to the frequency conversion modules 204 to adjust the phase of the signal on each transmission path propagating to the radiating elements 208. As illustrated in FIG. 2, the target 212 is closest to radiating element B, which can receive the return signal with the highest intensity. In this respect, the accuracy of the location identification can be resolved within the FOV of the radiating element B by adjusting the transmission beam radiated from the radiating element B onto the target 122 using a phase shift control signal to the corresponding phase shifter 204 by the phase control module 230. The range, or distance from the radiating element B to the target 212, and the velocity of target 212 can be determined from the received return signal.

Figure 3:
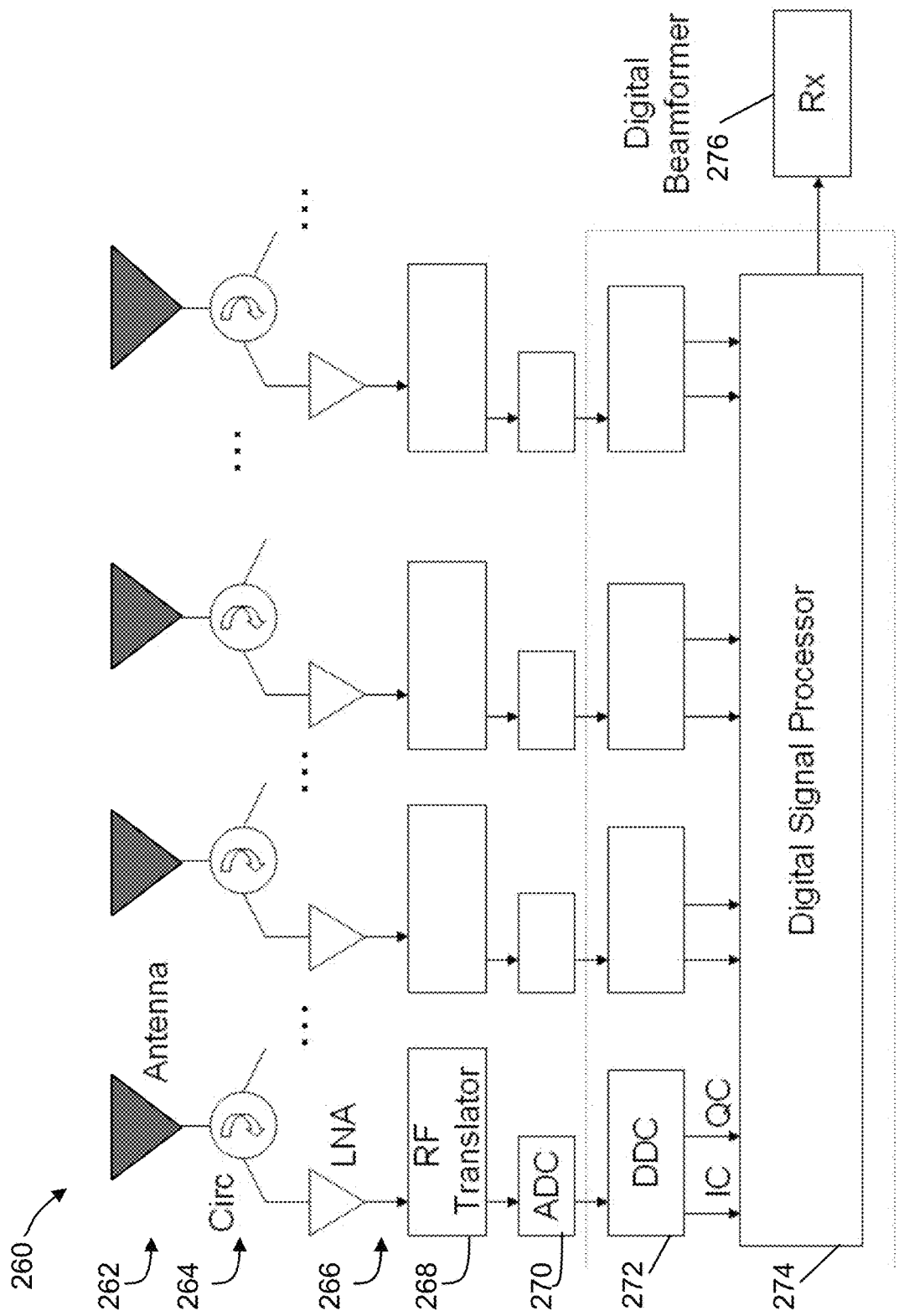
FIG. 3 illustrates another example of a DBF system.

FIG. 3 illustrates another example of a DBF system 260. The DBF system 260 includes radiating elements 262. The DBF system 262 has an RF FE for each radiating element 262. The RF FE on each receiving path includes a circulator 264, a Low-Noise Amplifier (LNA) 266, an RF translator 268, an ADC 270, and a Digital Down Converter (DDC) 272. The DBF system 260 also includes a Digital Signal Processor (DSP) unit 274 and a DBF receiver unit 276. The RF FE is communicably coupled to the DSP unit 274. In operation, return signals are received at the radiating elements 262. The received return signals are processed through a separate RF FE at each radiating element 262. For example, received return signals are first processed through the circulator 264 and fed to the LNA 266. The LNA 266 can filter the received signal to provide a signal within a desirable bandwidth to the RF translator 268. The RF translator 268 may convert the received return signals from a first frequency, such as RF, to a second frequency, such as IF or baseband frequency. The ADC 270 receives the return signal from the RF translator 268 and converts the received signal from the analog domain to the digital domain. The DDC 272 receives the digitized version of the return signal from the ADC 270 and generates In-phase (I)/Quadrature (Q) data (or I/Q samples). The DSP unit 274 receives the I/Q data that is then computationally processed. The DSP unit 274 then feeds the processed I/Q data to DBF receiver unit 276. The DBF system 260 incurs a substantial amount of FE circuitry, elements and functions, as well as processing time.

Figure 4:
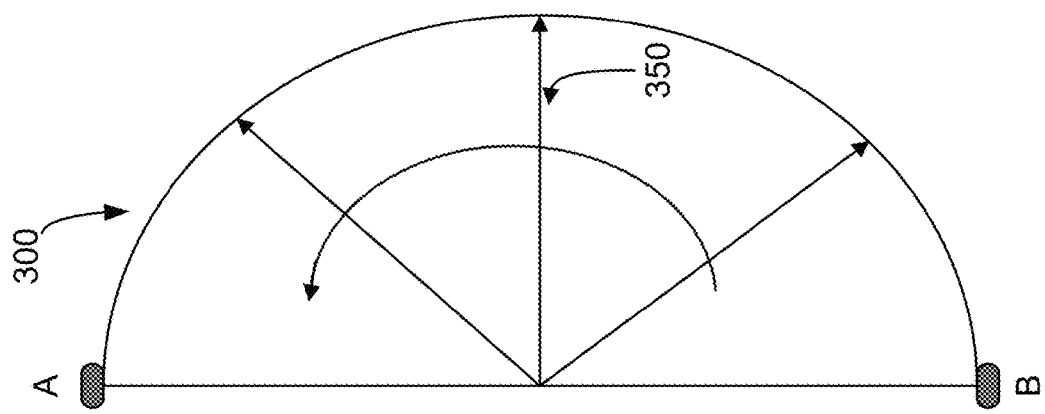
FIG. 4 conceptually illustrates a field of view of an antenna system, according to implementations of the subject technology.

FIG. 4 conceptually illustrates FOV 300 of an antenna system (e.g., 100, 200, 300), according to implementations of the subject technology. The antenna system includes radiating elements (depicted as "A" and "B") that share the FOV 300. As described above, beamforming and beam steering can be utilized to direct radiating signals 350 from individual antennas (e.g., A, B) over a desired FOV, such as the FOV 300. As depicted in FIG. 4, the radiating signals 350 can be directed across a range of angling degrees within the FOV 300.

Scanning across the FOV 300 can facilitate the accuracy in location identification of a target by one of the radiating elements A and B. For example, the radiating signals 350 can be adjusted using a phase shift control signal to a corresponding phase shifter such that a return signal from the target with a highest intensity can be detected within the FOV 300. As such, the radiating elements can receive signals having a sufficient amount of signal strength power to be identified as reflections or echoes based at least on a transmission signal to a target.

Figure 5:
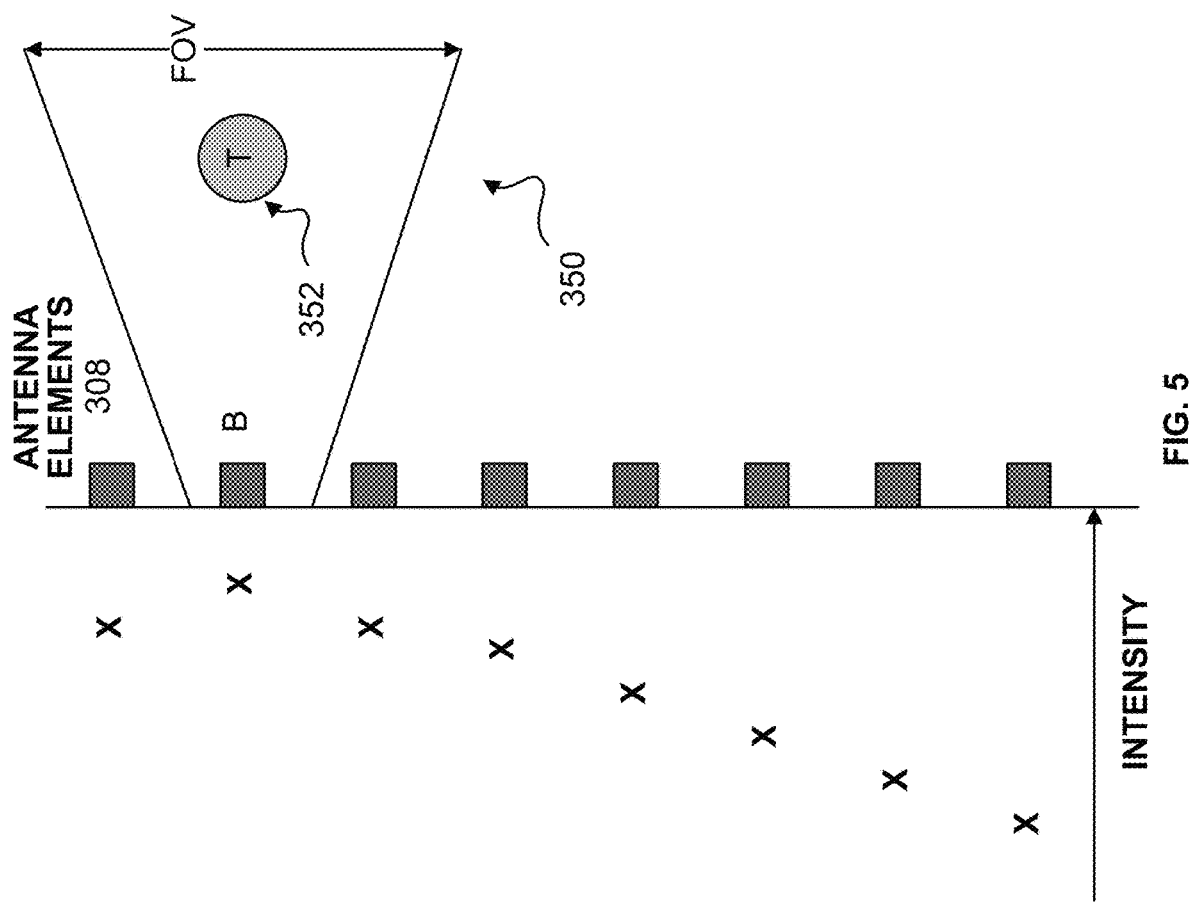
FIG. 5 illustrates a radar antenna system for object detection, according to implementations of the subject technology.

FIG. 5 illustrates a radar antenna system having radiating elements 308 for object detection, according to implementations of the subject technology. The radar antenna system detects a target 352 (depicted as "T") within a FOV 350 by determining which of radiating elements 308 is closest to the target 352 based on the intensity of return signals received by the radiating elements 308. When the radar antenna system, for example, identifies which of the radiating elements 308 has the highest received signal intensity, $I_{max}$, the location of the target 352 is determined to be within the FOV 350 of that radiating element 308. As illustrated in FIG. 5, the target 352 is closest to radiating element B, which can receive the return signal with the highest intensity.

Figure 6:
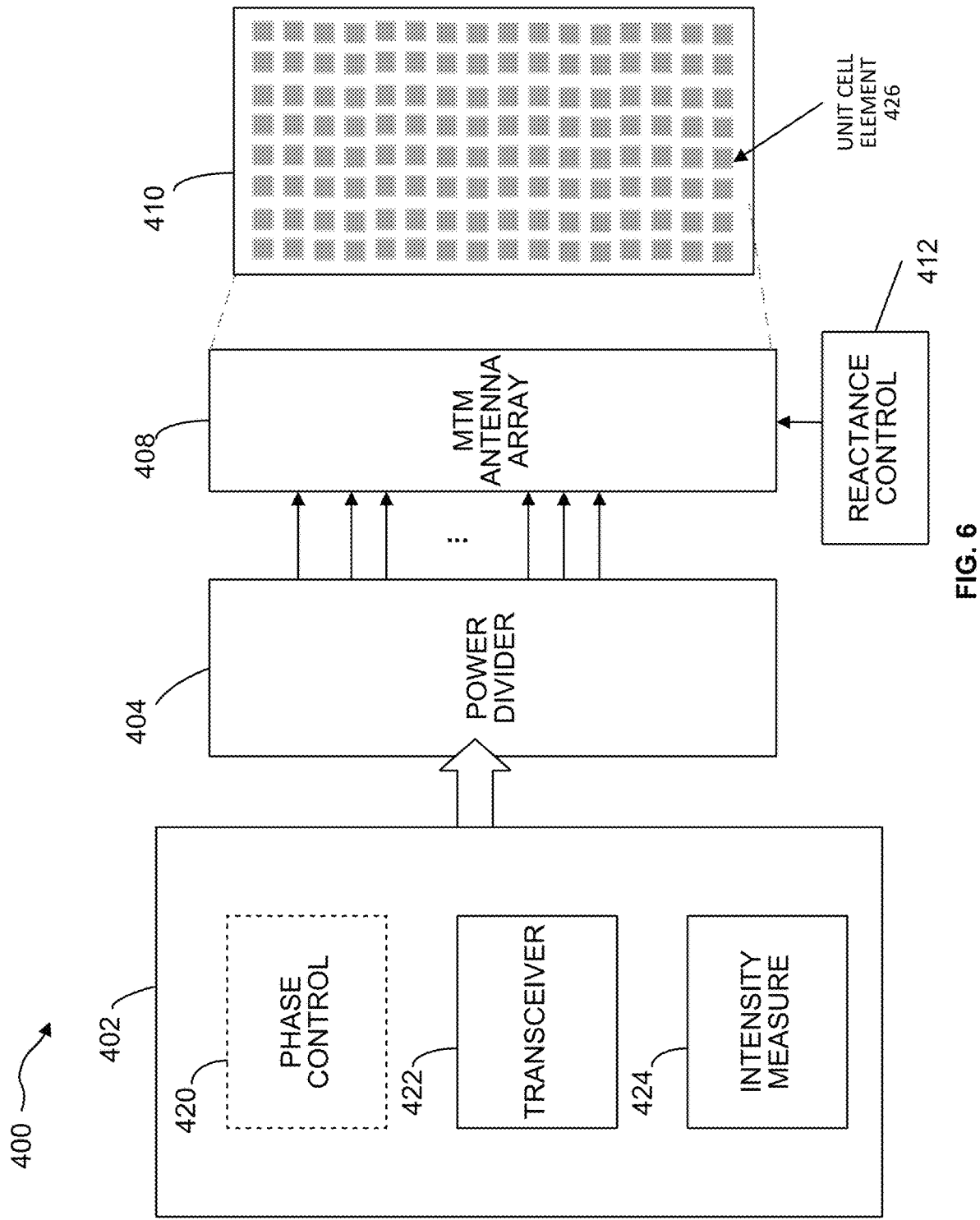
FIG. 6 illustrates a hybrid beamforming (HBF) system having analog beamforming and digital beamforming capability, according to implementations of the subject technology.

FIG. 6 illustrates a HBF system 400 having analog beamforming and digital beamforming capability, according to implementations of the subject technology. The HBF system 400 includes portions of an ABF system and a DBF system, and is depicted as a hybrid analog and digital beam forming system. The HBF system 400 includes a digital processing unit 402, a power divider 404, an MTM antenna array 408, and a reactance control module 412. The digital processing unit 402 includes a phase control module 420, a transceiver 422, and an intensity measure unit 424. The digital processing unit 402 is coupled to and feeds the power divider 404. The power divider 404 is coupled to and feeds the MTM antenna array 408. The reactance control module 412 is coupled to and controls the MTM antenna array 408. As depicted in FIG. 6, the composition of the MTM antenna array 408 is reproduced as radiating array 410, where the radiating array 410 incorporates meta-structures capable of manipulating electromagnetic waves using engineered radiating structures. A meta-structure, as generally defined herein, is an engineered, non- or semi-periodic structure that is spatially distributed to meet a specific phase and frequency distribution. In some implementations, the meta-structures include metamaterials (MTMs). The radiating array 410 includes individual unit cell elements 426 that are, or include at least a portion of, the meta-structures. Not all of the depicted components may be used, however, and one or more implementations may include additional components not shown in the figure. Variations in the arrangement and type of the components may be made without departing from the scope of the claims set forth herein. Additional components, different components, or fewer components may be provided.

In a transmission mode of the HBF system 400, the digital processing unit 402 sends signals to the power divider 404, which sends the power-divided signals over multiple transmission lines to the MTM antenna array 408. The reactance control module 412 controls the reactance behavior of the unit cell elements 426 in the MTM antenna array 408 to change the phase behavior of a radiated signal. The intensity measure unit 424 can determine the amount of intensity in the received signals at the MTM antenna array 408.

Figure 7:
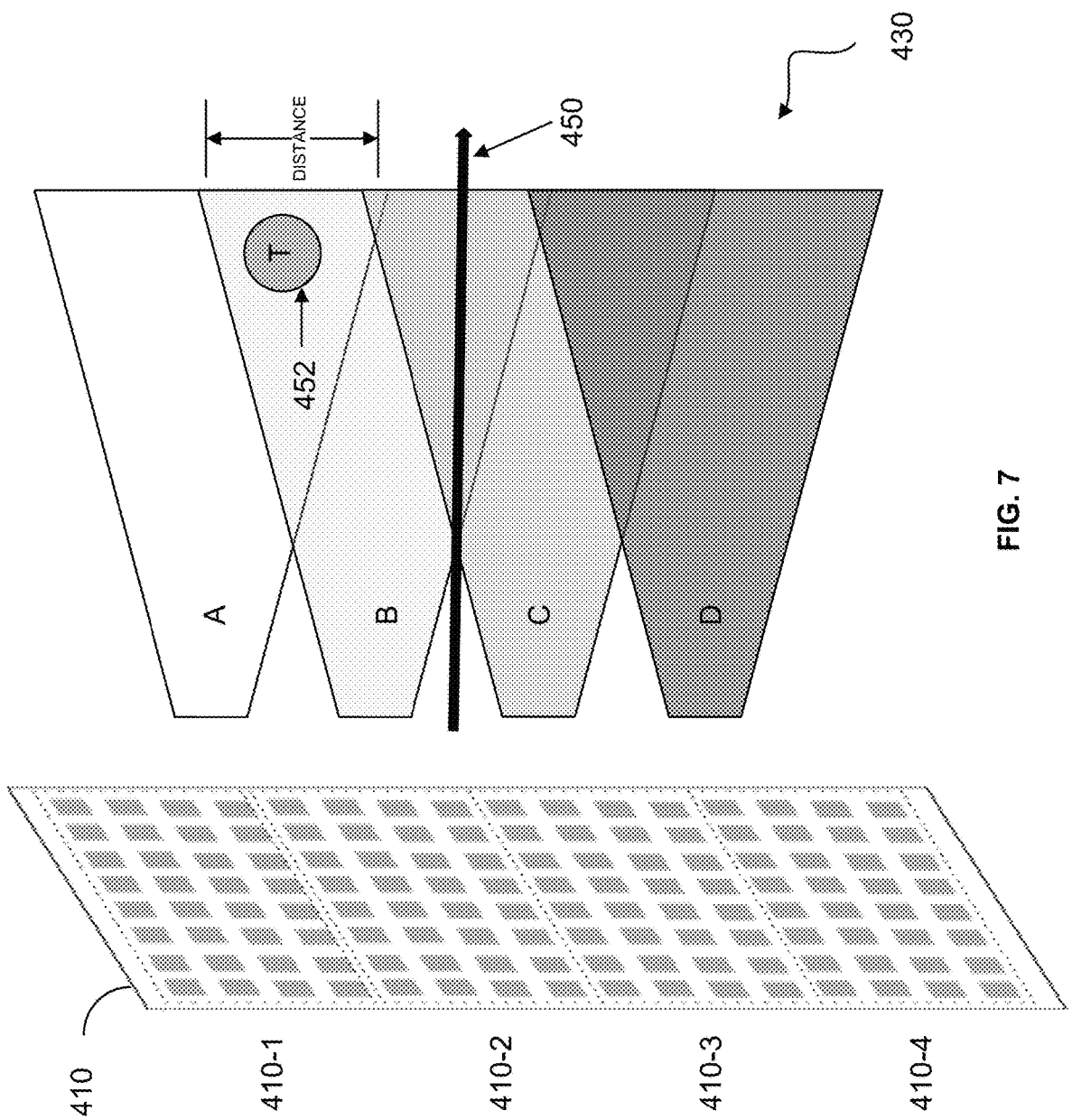
FIG. 7 illustrates a radiating array and example radiation patterns, according to implementations of the subject technology.

FIG. 7 illustrates a radiating array 410 and example radiation patterns, according to implementations of the subject technology. The radiating array 410 may be segmented into four subarrays 410-1, 410-2, 410-3, 410-4. Although radiating array 410 depicts four subarrays, the number of subarrays is arbitrary and can vary depending on implementation. In some aspects, each of the subarrays is controlled to have respective FoVs 430. As illustrated in FIG. 7, subarray 410-1 has a corresponding FOV A, subarray 410-2 has a corresponding FOV B, subarray 410-3 has a corresponding FOV C, and subarray 410-4 has a corresponding FOV D. The subarray 410-1 receives signals that identify the location of a target 452 within FOV A and subarray 410-2 receives signals that identify the location of the target 452 within FOV B. The signal intensity measurements of the received signals indicate that the target 452 is located within an identified distance of overlap of FOV A and FOV B, thus yielding a more refined result. The radiating array 410 takes advantage of the beam steering and beamforming capabilities of the MTM elements and the advantages of a DBF system. The use of a subarray of MTM elements in combination with intensity identification, enables refined accuracy of the target detection and identification with less computing power.

Figure 8:
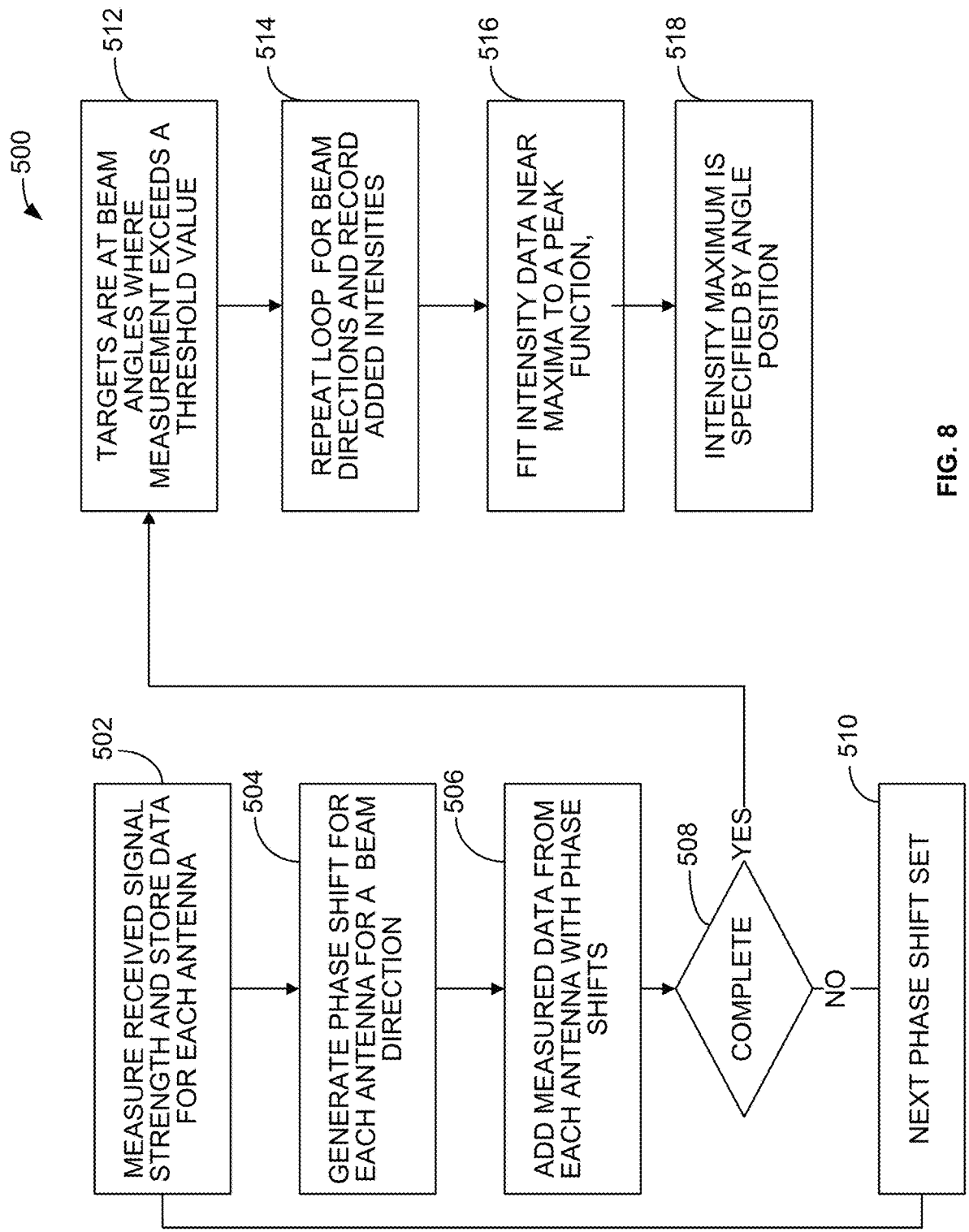
FIG. 8 illustrates a flow diagram of a process for analog beamforming and digital beamforming of radiation patterns from an antenna system, according to implementations of the subject technology.

FIG. 8 illustrates a flow diagram of an example process 500 for analog beamforming and digital beamforming of radiation patterns from an antenna system, according to implementations of the subject technology. For explanatory purposes, the example process 500 is primarily described herein with reference to the HBF system 400 of FIG. 6, however, the example process 500 is not limited to the HBF system 400 of FIG. 6, and the example process 500 can be performed by one or more other components of the HBF system 400. Further for explanatory purposes, the blocks of the example process 500 are described herein as occurring in serial, or linearly. However, multiple blocks of the example process 500 can occur in parallel. In addition, the blocks of the example process 500 can be performed in a different order than the order shown and/or one or more of the blocks of the example process 500 are not performed.

The example process 500 begins at step 502, where the antenna system measures a received signal strength at each antenna and stores the data for each antenna in a memory storage unit. Next, at step 504, the antenna system generates a phase shift for each antenna for a particular beam direction. Subsequently, at step 506, the measured data is added to the phase shifting function for each antenna. In this respect, a certain phase shift may be applied to a corresponding antenna based at least on the measured data. Next, at step 508, the antenna system determines whether all phase shifters are set. If all phase shifters are set, then the process 500 proceeds to step 512. Otherwise, the process 500 proceeds to step 510. At step 510, the next phase shifter is set based on the measured data. At step 512, the antenna system receives return signals from targets and obtains signal strength measurements of the return signals. In this step, the antenna system determines that the targets are at beam angles where the measurement is at a maximum or exceeds a threshold value. Subsequently, at step 514, the antenna system repeats a loop for determining beam directions and for recording intensity data indicating the additional intensities. Next, at step 516, the antenna system fits the intensity data near maxima to a peak function. Subsequently, at step 518, the intensity maximum is specified by angle position.

Figure 9:
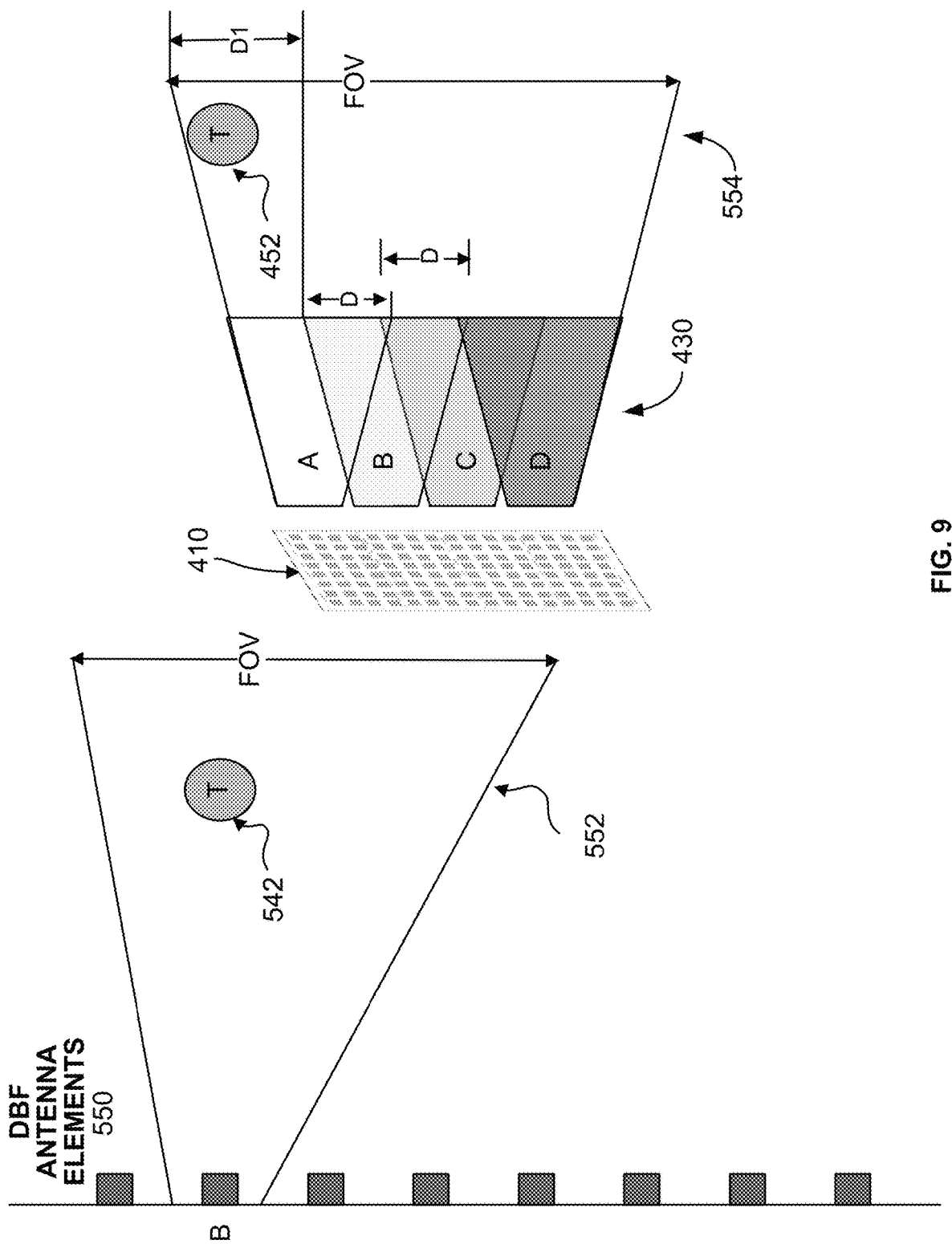
FIG. 9 illustrates an example of object detection in different antenna systems, according to implementations of the subject technology.

FIG. 9 illustrates an example of object detection in different antenna systems, according to implementations of the subject technology. A first antenna system includes DBF antenna elements 550, and may correspond to a traditional approach in digital beamforming. A second antenna system includes a radiating array 410 that mitigates the drawbacks of the DBF antenna elements 550, according to implementations of the subject technology. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The antenna system detects a target 542 (depicted as "T") within a FOV 552 by determining which of the DBF antenna elements 550 is closest to the target 542 based on the intensity of return signals received by the DBF antenna elements 550. The location of the target 542 within the FOV 552 corresponds to the FOV of DBF antenna element B. When the antenna system, for example, identifies which of the DBF antenna elements 550 has the highest received signal intensity, the location of the target 542 is determined to be within the FOV 552 of that DBF antenna element. As illustrated in FIG. 9, the target 542 is closest to DBF antenna element B, which can receive the return signal with the highest intensity.

The radiating array 410 may be segmented into multiple subarrays (e.g., four subarrays). The number of subarrays is arbitrary and can vary depending on implementation. In some aspects, each of the subarrays is controlled to have respective FOVs 430. As illustrated in FIG. 9, a first subarray has a corresponding FOV A, a second subarray has a corresponding FOV B, a third subarray has a corresponding FOV C, and a fourth subarray has a corresponding FOV D. The FOVs of the subarrays can overlap to form a composite FOV 554. In some aspects, the FOV A has a distance D1 in relation to the composite FOV 554. The first subarray receives signals that identify the location of the target 452 is within FOV A. The location of the target 542 can be detected within the distance D1 of the FOV A. Note that these figures are not drawn to scale, but rather are provided to illustrate the refined resolution.

The radiating array 410 has a FOV 554 corresponding to the FOV 552 of the DBF antenna element B. In this respect, the composite FOV 554 covers the same area as the FOV 552 of DBF antenna element B. The subarrays of the radiating array 410 enable configurations to achieve a desired resolution. In this example, the target 452 is located within the FOV A of the first subarray. Using the subarrays of the radiating array 410, the composite FOV 554 can be subdivided into four distinct FOV regions. This enables a finer resolution of detection compared to the resolution achieved by the DBF antenna elements 550. The subarrays of the radiating array 410 can scan a total angular scan range by control of the reactance of the individual radiating elements in the subarrays.

Figure 10:
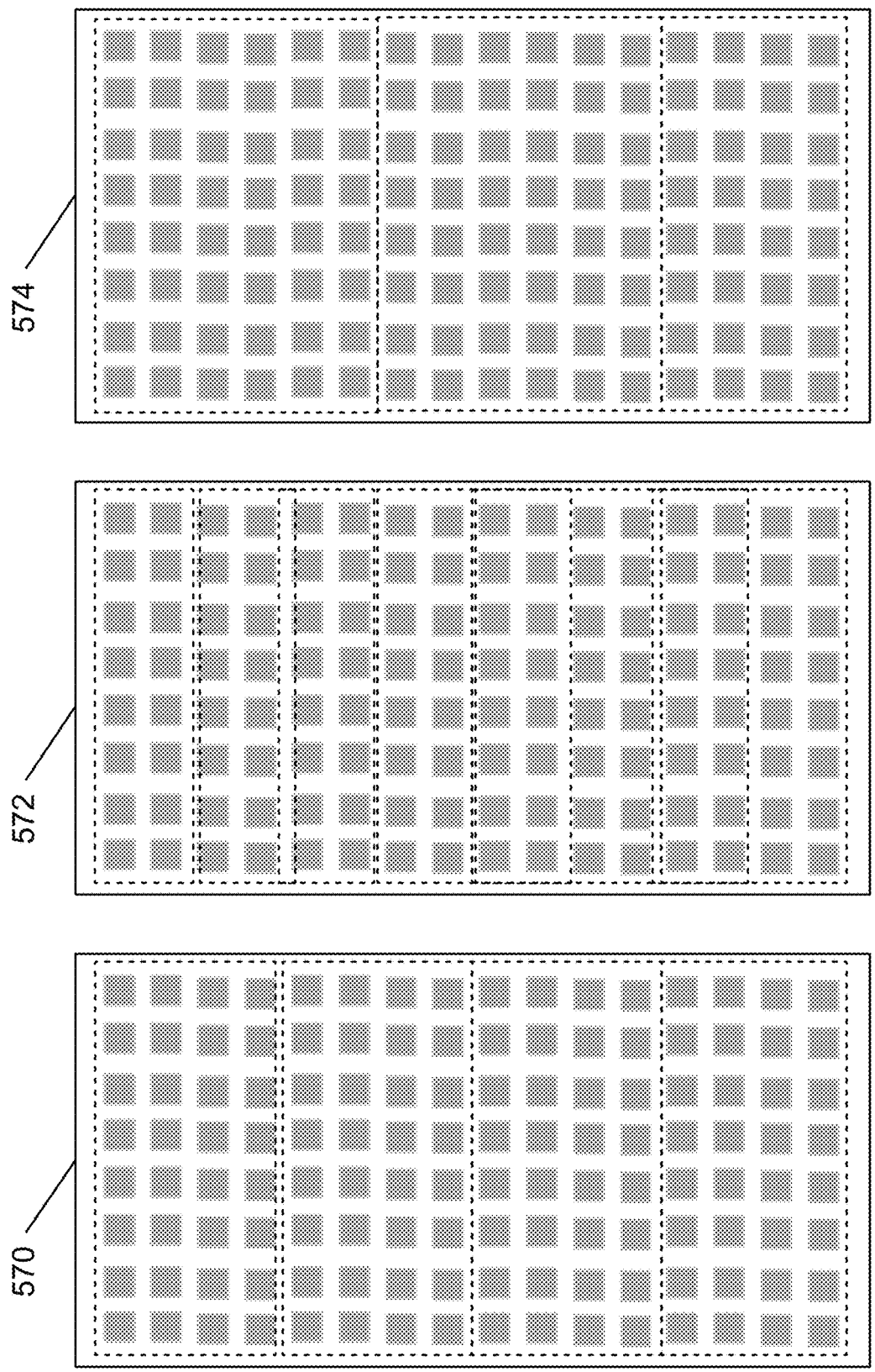
FIG. 10 illustrates subarray configurations of radiating elements, according to implementations of the subject technology.

FIG. 10 illustrates subarray configurations of radiating elements, according to implementations of the subject technology. In some implementations, a radiating array (e.g., 410) may be segmented into multiple types of subarray configurations, such as subarrays 570, 572 and 574. The subarrays 570, 572 and 574 may be uniform in configuration in some implementations, or have different configurations in other implementations. As depicted in FIG. 10, subarray 570 is divided into four (4) uniform subarrays, whereas subarray 572 is divided into eight (8) uniform subarrays providing finer resolution compared to the subarray 570. Subarray 574 is divided into unequal sized subarrays and may be used for a specific location or environment.

Figure 11:
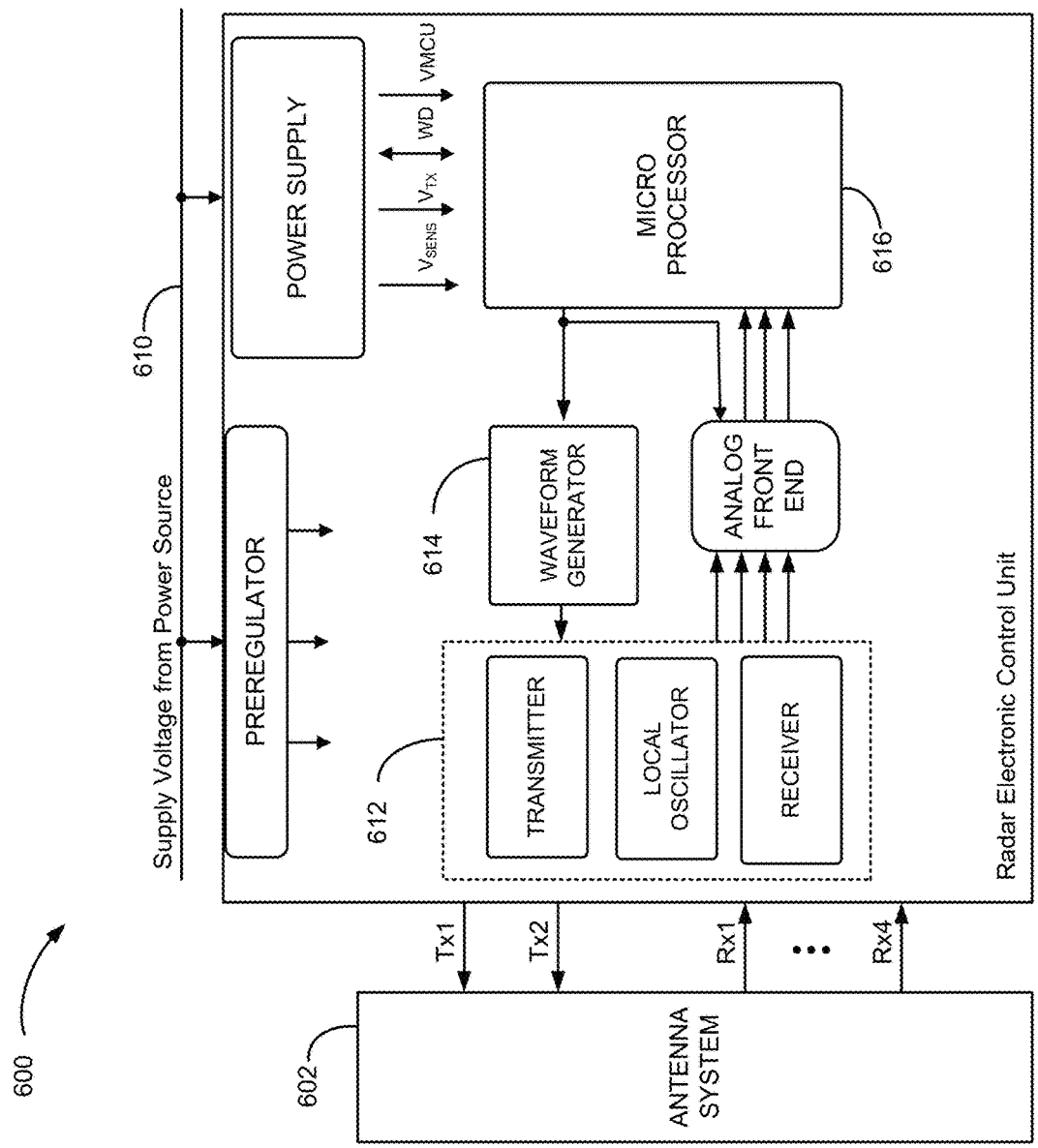
FIG. 11 illustrates a radar system having an antenna system and a control system, according to implementations of the subject technology.

FIG. 11 illustrates a radar system 600 having an antenna system 602 and a control system 610, according to implementations of the subject technology. The control system 610 includes a transceiver 612, a waveform generator 614, and a microprocessor 616. Not all of the depicted components may be used, however, and one or more implementations may include additional components not shown in the figure. Variations in the arrangement and type of the components may be made without departing from the scope of the claims set forth herein. Additional components, different components, or fewer components may be provided.

In some implementations, the antenna system 602 is an MTM antenna array having multiple radiating elements, in which at least one of the radiating elements has a reactance control mechanism to change reactance of a unit cell. The reactance control mechanism may be a varactor or variable capacitor diode to change the capacitance of the unit cell. The microprocessor 616 can control operation of the various functions, including power control, the waveform generator 614, the transceiver 612, transmit ports (Tx1, Tx2) and receive ports (Rx1 . . . Rx4). In some implementations, the control system 610 performs the digital processing to determine the amount of intensity of the received signals and execute a control action to the antenna system 602 as to location of a beam onto a target.

Figure 12:
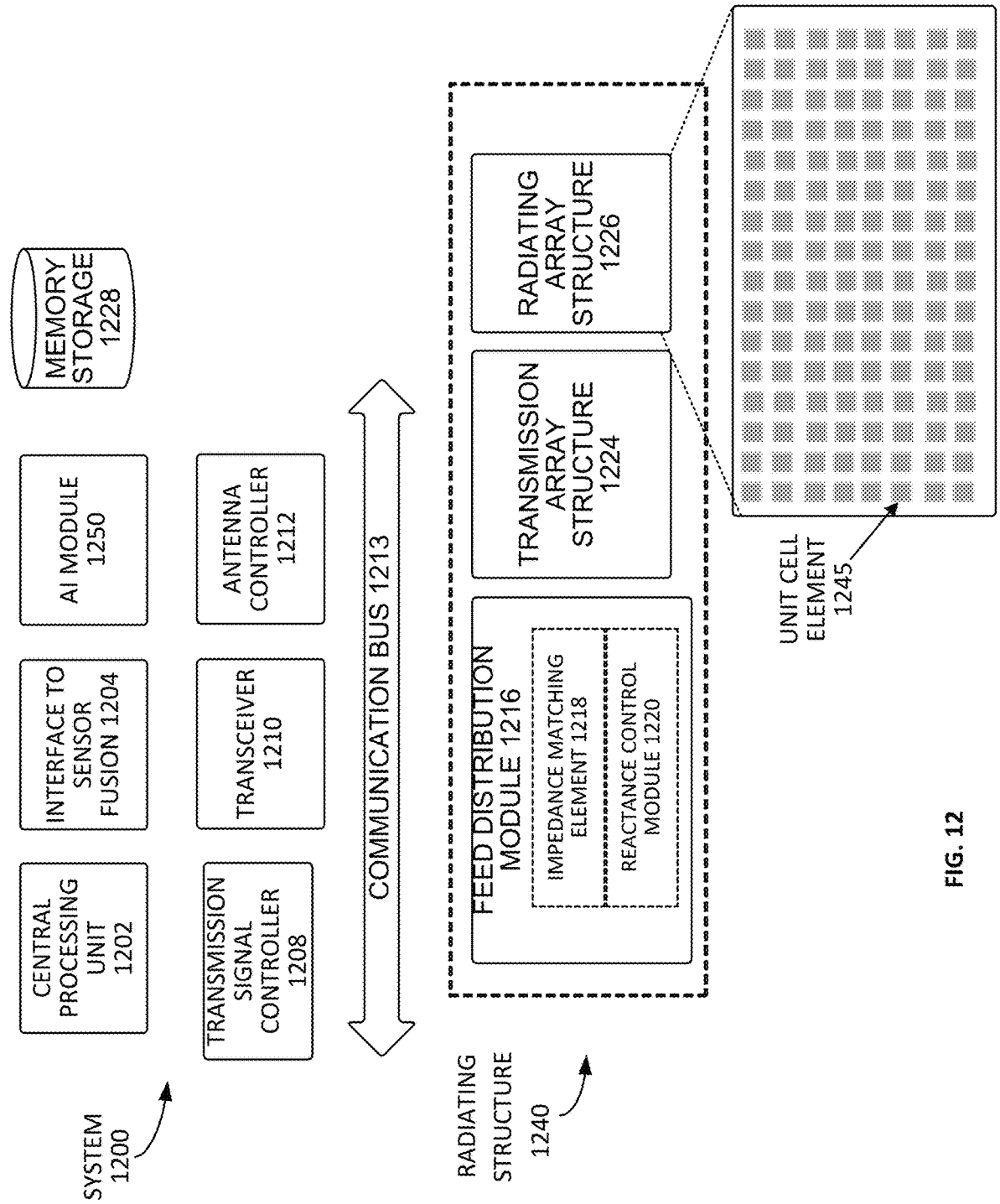
FIG. 12 conceptually illustrates an antenna system having analog and digital beamforming capabilities, according to implementations of the subject technology.

FIG. 12 conceptually illustrates an antenna system 1200 having analog and digital beamforming capabilities, according to implementations of the subject technology. The antenna system 1200 includes a central processing unit 1202, an interface-to-sensor fusion 1204, a transmission signal controller 1208, a transceiver 1210, an antenna controller 1212, an Artificial Intelligence (AI) module 1250, and a memory storage unit 1228. The antenna system 1200 is communicably coupled to a radiating structure 1240 through a communication bus 1213. The radiating structure 1240 includes a feed distribution module 1216, a transmission array structure 1224, and a radiating array structure 1226. The feed distribution module 1216 includes an impedance matching element 1218 and a Reactance Control Module (RCM) 1220. Not all of the depicted components may be used, however, and one or more implementations may include additional components not shown in the figure. Variations in the arrangement and type of the components may be made without departing from the scope of the claims set forth herein. Additional components, different components, or fewer components may be provided.

As in FIG. 12, the antenna system 1200 includes interfaces with other modules, such as through the interface-to-sensor fusion 1204, where information is communicated between the antenna system 1200 and a sensor fusion module (not shown) that is within an autonomous vehicle or is used for an Automated Driver Assistance System (ADAS). The antenna controller 1212 can control the generation and reception of electromagnetic radiation, or energy beams. The antenna controller 1212 determines the direction, power and other parameters of the beams and controls the radiating structure 1240 to achieve beam steering in various directions. The antenna system 1200 also includes modules for control of reactance, phase and signal strength in a transmission line.

The present disclosure is described with respect to a radar system, where the radiating structure 1240 is a structure having a feed structure, such as the feed distribution module 1216, with an array of transmission lines feeding a radiating array, such as the radiating array structure 1226, through the transmission array structure 1224. In some implementations, the transmission array structure 1224 includes a plurality of transmission lines configured with discontinuities within the conductive material and the radiating structure 1226 is a lattice structure of unit cell radiating elements proximate the transmission lines. The feed distribution module 1216 may include a coupling module for providing an input signal to the transmission lines, or a portion of the transmission lines. In some implementations, the coupling module is a power divider circuit that divides the input signal among the plurality of transmission lines, in which the power may be distributed equally among the N transmission lines or may be distributed according to another scheme, such that the N transmission lines do not all receive a same signal strength.

In one or more implementations, the feed distribution module 1216 incorporates a dielectric substrate to form a transmission path, such as a SIW. In this respect, the RCM 1220 in the feed distribution module 1216 may provide reactance control through integration with the transmission line, such as by insertion of a microstrip or strip line portion that couples to the RCM 1220. The RCM 1220 enables control of the reactance of a fixed geometric transmission line. In some implementations, one or more reactance control mechanisms (e.g., RCM 1220) may be placed within a transmission line. Similarly, the RCM 1220 may be placed within multiple transmission lines to achieve a desired result. The RCM 1220 may have individual controls or may have a common control. In some implementations, a modification to a first reactance control mechanism is a function of a modification to a second reactance control mechanism.

In some implementations, the radiating structure 1240 includes the power divider circuit and a control circuit therefor. The control circuit includes the RCM 1220, or reactance controller, such as a variable capacitor, to change the reactance of a transmission circuit and thereby control the characteristics of the signal propagating through the transmission line. The RCM 1220 acts to change the phase of a signal radiated through individual antenna elements of the radiating array structure 1226. Where there is such an interruption in the transmission line, a transition is made to maintain signal flow in the same direction. Similarly, the RCM 1220 may utilize a control signal, such as a Direct Current (DC) bias line or other control means, to enable the antenna system 1200 to control and adjust the reactance of the transmission line. In some implementations, the feed distribution module 1216 includes one or more structures that isolate the control signal from the transmission signal. In the case of an antenna transmission structure, the RCM 1220 may serve as the isolation structure to isolate DC control signal(s) from Alternating Current (AC) transmission signals.

The impedance matching element 1218 is coupled to the transmission array structure 1224. In some implementations, the impedance matching element 1218 incorporates the RCM 1220 to modify a capacitance of the radiating array structure 1226. The impedance matching element 1218 may be configured to match the input signal parameters with radiating elements, and therefore, there are a variety of configurations and locations for this element, which may include a plurality of components.

In one or more implementations, the impedance matching element 1218 includes a directional coupler having an input port to each of the adjacent transmission lines. The adjacent transmission lines and the impedance matching element 1218 form a super element, in which the adjacent transmission line pair has a specific phase difference, such as a 90-degree phase difference with respect to each other.

The transmission line may have various portions, in which a first portion receives an transmission signal as an input, such as from a coaxial cable or other supply structure, and the transmission signal traverses a substrate portion to divide the transmission signal through a corporate feed-style network resulting in multiple transmission lines that feed multiple super elements. Each super element includes a transmission line having a plurality of slots. The transmission signal radiates through these slots in the super elements of the transmission array structure 1224 to the radiating array structure 1226, which includes an array of MTM elements positioned proximate the super elements. In some implementations, the array of MTM elements is overlaid on the super elements, however, a variety of configurations may be implemented. The super elements effectively feed the transmission signal to the array of MTM elements, from which the transmission signal radiates. Control of the array of MTM elements results in a directed signal or beamform.

As described in the present disclosure, a reactance control mechanism (e.g., RCM 1220) is incorporated to adjust the effective reactance of a transmission line and/or a radiating element fed by a transmission line. In some implementations, the RCM 1220 includes a varactor that changes the phase of a signal. In other implementations, alternate control mechanisms are used. The RCM 1220 may be, or include at least a portion of, a varactor diode having a bias voltage applied by a controller (not shown). The varactor diode may serve as a variable capacitor when a reverse bias voltage is applied. As used herein, the term "reverse bias voltage" is also referred to herein as "reactance control voltage" or "varactor voltage." The value of the reactance, which in this case is capacitance, is a function of the reverse bias voltage value. By changing the reactance control voltage, the capacitance of the varactor diode is changed over a given range of values. Alternate implementations may use alternate methods for changing the reactance, which may be electrically or mechanically controlled. In some implementations, the varactor diode also may be placed between conductive areas of a radiating element. With respect to the radiating element, changes in varactor voltage produce changes in the effective capacitance of the radiating element. The change in effective capacitance changes the behavior of the radiating element and in this way the varactor diode may be considered as a tuning element for the radiating elements in beam formation.

In some implementations, the radiating array structure 1226 is coupled to the antenna controller 1212, the central processing unit 1202, and the transceiver 1210. The transmission signal controller 1208 generates the specific transmission signal, such as a FMCW signal, which is used as for radar sensor applications as the transmitted signal is modulated in frequency, or phase. The FMCW transmitter signal enables radar to measure range to an object by measuring the phase differences in phase or frequency between the transmitted signal and the received signal, or reflected signal. Other modulation types may be incorporated according to the desired information and specifications of a system and application. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth. The received information is stored in the memory storage unit 1228, in which the information structure may be determined by the type of transmission and modulation pattern. Other modulation schemes may be employed to achieve desired results. The transmission signal controller 1208 may generate a cellular modulated signal, such as an Orthogonal Frequency Division Multiplexing (OFDM) signal. The transmission feed structure may be used in a variety of systems. In some systems, the transmission signal is provided to the antenna system 1200 and the transmission signal controller 1208 may act as an interface, translator or modulation controller, or otherwise as required for the transmission signal to propagate through a transmission line network of the feed distribution module 1216.

Continuing with FIG. 12, the radiating structure 1240 includes the radiating array structure 1226, composed of individual radiating elements discussed herein. The radiating array structure 1226 may take a variety of forms and is designed to operate in coordination with the transmission array structure 1224, in which individual radiating elements, depicted as unit cell element 1245, correspond to elements within the transmission array structure 1224. As used herein, the "unit cell element" is referred to as an "MTM unit cell" or "MTM element," and these terms are used interchangeably throughout the present disclosure without departing from the scope of the subject technology. The MTM unit cells include a variety of conductive structures and patterns, such that a received transmission signal is radiated therefrom. The MTM unit cell may serve as an artificial material, meaning a material that is not naturally occurring. Each MTM unit cell has some unique properties. These properties include a negative permittivity and permeability resulting in a negative refractive index; these structures are commonly referred to as Left-Handed Materials (LHM). The use of LHM enables behavior not achieved in classical structures and materials. The MTM array is a periodic arrangement of unit cells that are each smaller than the transmission wavelength. One implementation is illustrated in which the radiating array structure 1226 is an 8×126 cell array, in which each of the unit cell elements 1245 has a uniform size and shape; however, alternate and other implementations may incorporate different sizes, shapes, configurations and array sizes.

As seen in the present disclosure, interesting effects may be observed in propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications.

In the system 1200 of FIG. 12, the impedance matching element 1218 and the reactance control element 1220 are implemented to improve performance, reduce signal losses and so forth. In some implementations, the RCM 1220 includes a capacitance control mechanism controlled by the antenna controller 1212 to control the phase of a transmission signal as it radiates from radiating array structure 1226. In some implementations, the antenna controller 1212 determines a voltage matrix to apply to the reactance control mechanisms within the RCM 1220 to achieve a given phase shift or other antenna parameters. In some implementations, the radiating array structure 1226 is adapted to transmit a directional beam without incorporating digital beam forming techniques, but rather through active control of the reactance parameters of the individual unit cell elements 1245 that make up the radiating array structure 1226.

In a radar implementation, the antenna controller 1212 receives information from within the antenna system 1200. As illustrated in FIG. 12, information is provided from the radiating structure 1240 and from the interface-to-sensor fusion 1204 to a sensor fusion module (not shown). In some implementations, the sensor fusion module is communicably coupled to the AI module 1250. The AI module 1250 can assist in detection, classification and identification of detected objects, and understanding of the environment within which the radar operates. This implementation depicts a vehicular control system, but is applicable in other fields and applications as well. In a vehicular control system, the sensor fusion module can receive information (digital and/or analog form) from multiple sensors and can interpret that information, making various inferences and initiating actions accordingly. One such action is to provide information to the antenna controller 1212, in which that information may be the sensor information or may be an instruction to respond to sensor information. The sensor information may provide details of an object detected by one or more sensors, including the object's range, velocity, acceleration, and so forth. The sensor fusion module may detect an object at a location and instruct the antenna controller 1212 to focus a beam on that location. The antenna controller 1212 then responds by controlling the transmission beam through the reactance control module 1220 and/or other control mechanisms for the radiating structure 1240. The instruction from the antenna controller 1212 acts to control generation of radiation beams, in which a radiation beam may be specified by antenna parameters such as beam width, transmit angle, transmit direction and so forth.

The transceiver 1210 prepares a signal for transmission, such as a signal for a radar device, in which the signal is defined by modulation and frequency. The signal is received by each unit cell element 1245 of the radiating array structure 1226 and the phase of the radiating array structure 1226 is adjusted by the antenna controller 1212. In some implementations, transmission signals are received by a portion, or subarray, of the radiating array structure 1226. The radiating array structure 1226 may be applicable to many applications, including radar and cellular antennas. The subject technology considers an application in autonomous vehicles, such as an on-board sensor to detect objects in the environment of the vehicle. Alternate implementations may use the subject technology for wireless communications, medical equipment, sensing, monitoring, and so forth. Each application type incorporates designs and configurations of the elements, structures and modules described herein to accommodate their needs and goals.

In the antenna system 1200, a signal is specified by the antenna controller 1212, which may be in response to prior signals processed by an Artificial Intelligence (AI) module that is communicably coupled to the antenna system 1200 over the communication bus 1213. In other implementations, the signal may be provided from the interface-to-sensor fusion 1204. In still other implementations, the signal may be based on program information from the memory storage unit 1228. There are a variety of considerations to determine the beam formation, in which this information is provided to the antenna controller 1212 to configure the various unit cell elements 1245 of the radiating array structure 1226. The transmission signal controller 1208 generates the transmission signal and provides the transmission signal to the feed distribution module 1216, which provides the signal to transmission array structure 1224 and radiating array structure 1226.

When the transmission signal is provided to the radiating structure 1240, such as through a coaxial cable or other connector, the transmission signal propagates through the feed distribution module 1216 to the transmission array structure 1224 through which the transmission signal radiates to the radiating array structure 1226 for transmission through the air. As depicted in FIG. 12, the transmission array structure 1224 and the radiating array structure 1226 are arranged side-by-side, however, the physical arrangement of the radiating array structure 1226 relative to the transmission array structure 1224 may be different depending on implementation.

The impedance matching element 1218 and the reactance control module 1220 may be positioned within the architecture of feed distribution module 1216. In some implementations, or one or both may be external to the feed distribution module 1216 for manufacture or composition as an antenna or radar module in other implementations. The impedance matching element 1218 works in coordination with the reactance control module 1220. The implementation illustrated in FIG. 12 enables phase shifting of radiating signals from radiating array structure 1226. This enables a radar unit to scan a large area with the radiating array structure 1226. For vehicle applications, sensors seek to scan the entire environment of the vehicle. These then may enable the vehicle to operate autonomously, or may provide driver assist functionality, including warnings and indicators to the driver, and controls to the vehicle.

Figure 13:
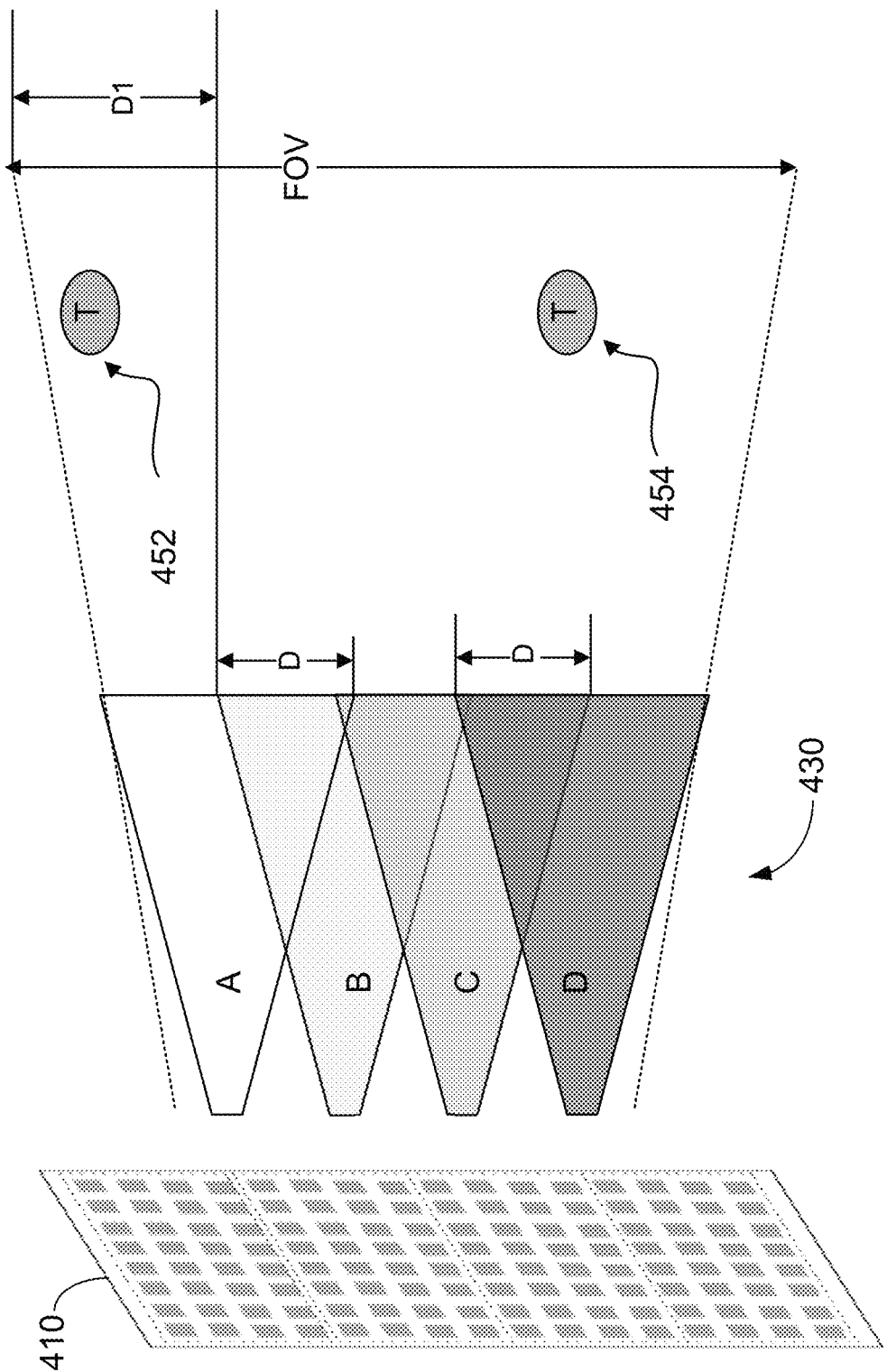
FIG. 13 illustrates an example of object detection using multiple subarrays of an antenna system, according to implementations of the subject technology.

FIG. 13 illustrates an example of object detection using multiple subarrays of an antenna system, according to implementations of the subject technology. The antenna system includes a radiating array 410 segmented into four subarrays that have respective FOVs 430 (depicted as "A," "B," "C," and "D"), and combined form a composite FOV. The antenna system can detect two targets 452 and 454 in the composite FOV of the radiating array 410. For example, the target 452 may be located within the FOV A corresponding to a first subarray. A second subarray corresponding to FOV B may also receive sufficient signal intensity from the target 452 such that it also detects the target 452. In this respect, the two FOVs (e.g., A and B) overlap for a distance, D, providing further refinement of resolution to identify the angle of arrival of signals from target 452. The target 454 may be located within the FOV D corresponding to a fourth subarray, and is also located within FOV C corresponding to a third subarray. In this respect, the two subarrays receive signal intensity measurements within the FOVs C and D. As depicted in FIG. 13, the two FOVs (e.g., C and D) overlap for a distance, D, providing further refinement of resolution to identify the angle of arrival of signals from target 454.

Figure 14:
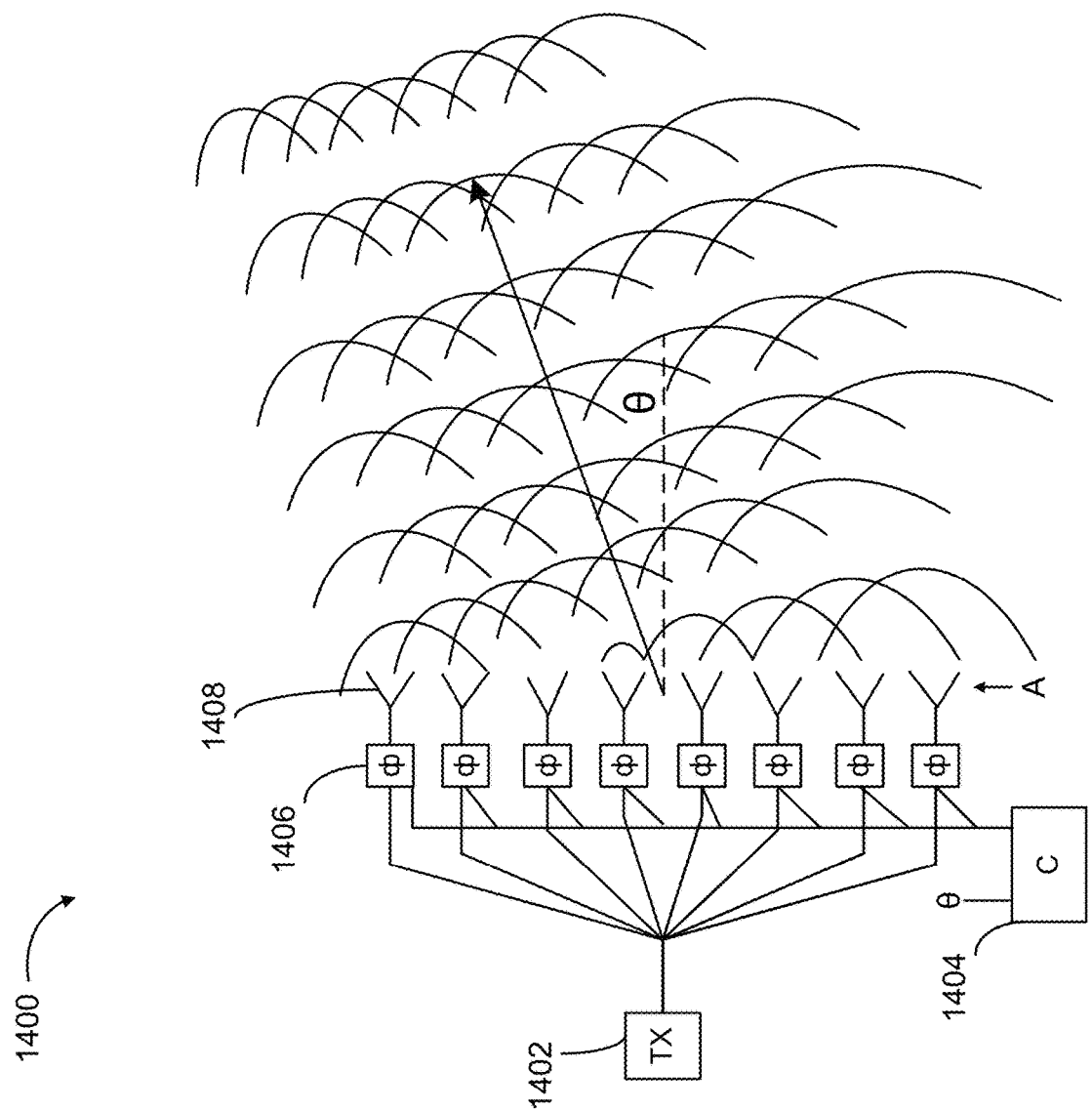
FIG. 14 illustrates an example of electromagnetic waves in a phased array of radiating elements in an antenna system supporting analog and digital beamforming, according to implementations of the subject technology.

FIG. 14 illustrates an example of electromagnetic waves in a phased array of radiating elements in an antenna system 1400 supporting analog and digital beamforming, according to implementations of the subject technology. The antenna system 1400 includes a transmitter 1402, a phase control module 1404, phase shifters 1406 and antenna elements 1408. The phase shifters 1406 may be individually controlled by a separate control signal from the phase control module 1404, which causes the antenna elements 1408 to produce a radiation pattern comprised of electromagnetic waves. As illustrated in FIG. 14, each of the antenna elements 1408 has a phase shift that contributes to the radiation pattern having directivity at an angle θ. The amount of phase shift applied to each of the antenna elements 1408 may be the same in some implementations, or the amount of phase shift applied to each of the antenna elements may be different in other implementations.

Figure 15:
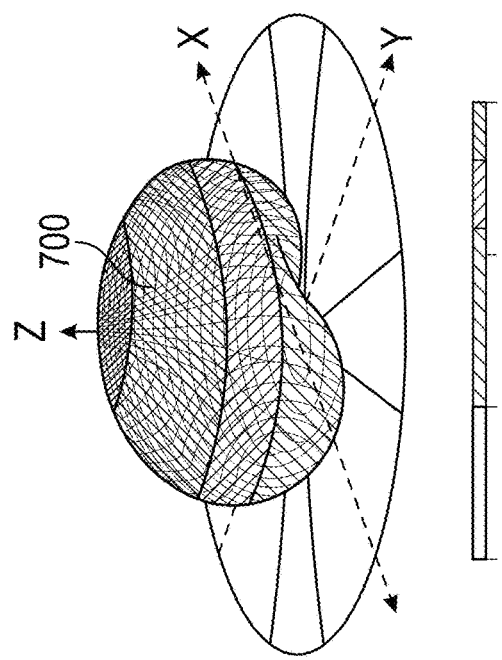
FIG. 15 illustrates a radiation pattern associated with a single antenna, according to implementations of the subject technology.

FIG. 15 illustrates a radiation pattern 700 associated with a single antenna, according to implementations of the subject technology. The radiation pattern 700 may be an isotropic radiation pattern. The radiation pattern 700 may be added to multiple radiation patterns when several of these individual antennas, each having its own radiation pattern, may be configured into an array. In some aspects, the array can generate a composite radiation pattern from the individual antennas. This difference between individual radiation patterns and a composite radiation pattern is a result of constructive and destructive interference of the signals from the individual antennas of the array.

Figure 16:
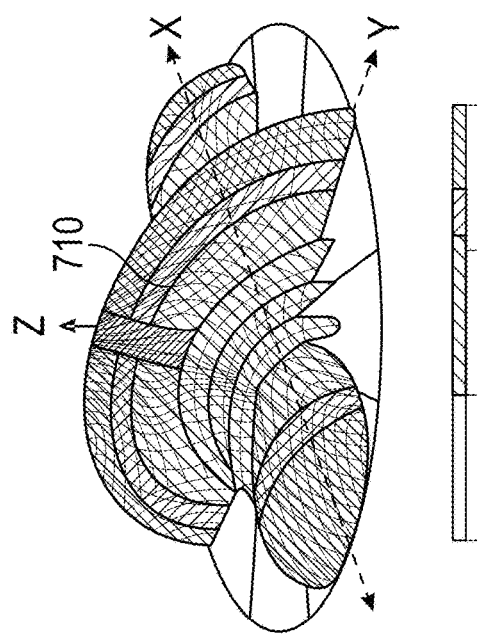
FIG. 16 illustrates a radiation pattern associated with a composite array of antennas, according to implementations of the subject technology.

FIG. 16 illustrates a radiation pattern 710 associated with a composite array of antennas, according to implementations of the subject technology. The radiation pattern 710 may correspond to beam radiation from an array of antennas that send/receive radiation signals at equal strengths in all directions. In some aspects, the width of a main maximum of the radiation pattern 710 is a function of the signal wavelength and the size of the array. In one example, the main maximum of the radiation pattern 710 is proportional to the wavelength of transmission signals divided by the aperture size, in which the aperture size is the width of the array.

Figure 17:
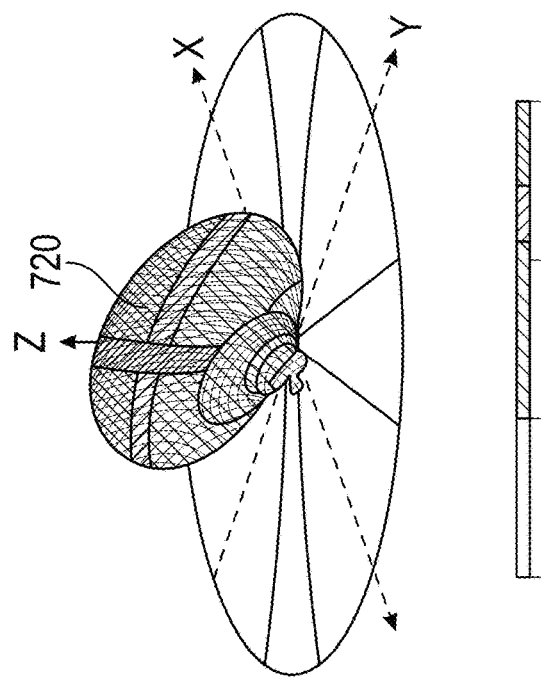
FIG. 17 illustrates a combination radiation pattern formed by an antenna array, according to implementations of the subject technology.

FIG. 17 illustrates a combination radiation pattern 720 formed by an antenna array, according to implementations of the subject technology. For example, the combination radiation pattern 720 may be formed by two antennas, such as those described in FIGS. 15 and 16. If an individual antenna produces a narrow beam, the array can produce a narrower beam with suppressed side lobes. As depicted in FIG. 17, the combination radiation pattern 720 includes a main lobe pattern (similar to radiation pattern of FIG. 15) with side lobes that are suppressed along the x-axis, thereby producing a narrower radiation pattern than that shown in FIG. 16.

As seen in FIGS. 15-17, an antenna array radiation pattern has distinct side lobes in the x direction, while the single antenna radiation pattern (isotropic) does not radiate much in those areas. The array radiation pattern (e.g., radiation pattern 710), or combination pattern (e.g., combination radiation pattern 720) can also show minimal to no side lobes. This result is even stronger when the radiation pattern of a single antenna is more beam shaped than that illustrated in FIG. 15. These are not meant to be comprehensive examples, but rather are provided for clarity of understanding.

It is appreciated that the previous description of the disclosed examples is provided to enable any person skilled in the art to make or use the present disclosure. Various modifications to these examples can be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A hybrid beamforming system, comprising:
a digital processing unit;
a metastructure (MTM) antenna array having a plurality of antenna subarrays;

a power divider coupled to the digital processing unit and configured to distribute phase control signaling from the digital processing unit to the MTM antenna array; and a reactance control module coupled to the MTM antenna array and configured to control a reactance behavior of unit cell elements in the MTM antenna array that changes a phase behavior of a radiated signal based at least on the phase control signaling.

2. The hybrid beamforming system of claim 1, wherein each of the plurality of subarrays includes an analog beamforming antenna.

3. The hybrid beamforming system of claim 1, wherein the digital processing unit is configured to operate as a digital beamforming antenna.

4. The hybrid beamforming system of claim 1, wherein the digital processing unit comprises:

a phase control module;
a transceiver; and
an intensity measure unit.

5. The hybrid beamforming system of claim 4, wherein the phase control module adjusts a phase of radiated signals for at least one radiating element.

6. The hybrid beamforming system of claim 5, wherein the phase control module beam steers the system changing phase behavior of a radiated signal.

7. The hybrid beamforming system of claim 1, wherein the power divider is configured to send power-divided signals over a plurality of transmission lines to the metastructure antenna array.

8. The hybrid beamforming system of claim 1, wherein the reactance control module comprises a varactor or a variable capacitor diode configured to change a capacitance of a unit cell element in the metastructure antenna array.

9. The hybrid beamforming system of claim 1, wherein each of the plurality of antenna subarrays has a respective field of view.

10. The hybrid beamforming system of claim 9, wherein a first antenna subarray of the plurality of antenna subarrays is configured to receive one or more return signals that identify a location of a target within a first field of view corresponding to the first antenna subarray with a first resolution and a second antenna subarray is configured to receive the one or more return signals that identify the location of the target within a second field of view corresponding to the second antenna subarray with a second resolution, and wherein the first field of view and the second field of view overlap for a distance to identify an angle of arrival of the one or more return signals form the target with a third resolution that is greater than the first resolution and the second resolution.

11. The hybrid beamforming system of claim 10, wherein the digital processing unit is further configured to obtain signal intensity measurements of the one or more return signals that indicate that the target is located within an identified distance of overlap of the first field of view and the second field of view.

12. The hybrid beamforming system of claim 11, wherein the digital processing unit is further configured to identify which of the plurality of antenna subarrays has a highest received signal intensity from the obtained signal intensity measurements.

13. The hybrid beamforming system of claim 1, wherein the plurality of antenna subarrays comprises a first antenna subarray having a first number of radiating elements and a second antenna subarray having a second number of radiating elements, wherein the first number of radiating elements is equivalent to the second number of radiating elements.

14. The hybrid beamforming system of claim 13, further comprising:

a digital control mechanism coupled to the array of radiating elements and configured to adjust a field of view of the array of radiating elements.

15. The hybrid beamforming system of claim 14, wherein the hybrid beamforming system is adapted for object detection in a radar module.

16. The hybrid beamforming system of claim 1, wherein the plurality of antenna subarrays comprises a first antenna subarray having a first number of radiating elements and a second antenna subarray having a second number of radiating elements, wherein the first number of radiating elements is different from the second number of radiating elements.

17. The hybrid beamforming system of claim 1, further comprising:

an intensity measurement module configured to determine an amount of intensity in a received signal at a corresponding subarray of the plurality of subarrays; and a processing unit configured to identify a first subarray of the plurality of subarrays that corresponds to a maximum intensity value of the received signal and to determine an angle of arrival of the received signals at the first subarray.

18. The hybrid beamforming system of claim 17, wherein the hybrid beamforming system is a phased array analog beamforming system.

19. The hybrid beamforming system of claim 1, wherein the metastructure antenna array is an array of elements spatially distributed to meet a specific phase and frequency distribution.

20. The hybrid beamforming system of claim 1, wherein the metastructure antenna array comprises a metastructure having an engineered, non- or semi-periodic structure.

* * * * *